United States Patent
Wakairo (10) Patent No.: US 6,957,141 B1
(45) Date of Patent: Oct. 18, 2005

(54) DIAGNOSTIC SYSTEM FOR INTERNAL COMBUSTION ENGINE

(75) Inventor: Masahiko Wakairo, Gunma (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/004,921

(22) Filed: Dec. 7, 2004

(30) Foreign Application Priority Data

Apr. 27, 2004 (JP) .............................. 2004-131093

(51) Int. Cl.$^7$ ........................................... F02D 41/00

(52) U.S. Cl. .................. 701/114; 123/90.15; 123/399; 73/117.3

(58) Field of Search .................. 701/114, 110, 115, 701/102; 73/116, 117.3; 123/399, 90.15, 123/90.17

(56) References Cited

U.S. PATENT DOCUMENTS

| 6,877,466 B2 * | 4/2005 | Shindou et al. .......... 123/90.15 |
| 2004/0211393 A1 * | 10/2004 | Grau ....................... 123/90.15 |

FOREIGN PATENT DOCUMENTS

| DE | 43 32 098 A1 * | 3/1995 | .......... F02D 41/00 |
| JP | 2-176141 A | 7/1990 | |

* cited by examiner

Primary Examiner—Hieu T. Vo
(74) Attorney, Agent, or Firm—Foley & Lardner LLP (57) ABSTRACT

A diagnostic system for an internal combustion engine including a plurality of cylinder banks. The system includes a throttle position sensor mounted in each of the cylinder banks, for detecting a throttle opening of a throttle valve of an associated one of the cylinder banks. The throttle openings of the cylinder banks are controlled in accordance with a common target. An ECU makes a check to determine whether the detected throttle openings are same. The ECU determines in accordance with the comparison whether or not there is abnormality in at least one of the throttle valves and the throttle position sensors.

12 Claims, 6 Drawing Sheets

DIAGNOSTIC SYSTEM FOR INTERNAL COMBUSTION ENGINE

BACKGROUND OF THE INVENTION

The present invention relates generally to diagnostic systems for internal combustion engines, and more particularly to a diagnostic system for an internal combustion engine including a plurality of cylinder banks.

In general, internal combustion engines are controlled optimally in accordance with operating conditions of sensing targets which are determined based on information collected by sensors. Some engines include redundant systems for safety, in which a sensing target is monitored by a plurality of sensors. This redundant system leads to safe operation of the engine, even when there occurs a failure in one or more of the sensors. Such a fail-safe control system for an internal combustion engine is shown in a Published Japanese Patent Application No. H2(1990)-176141 (hereinafter referred to as "JP2-176141). In JP2-176141, the control system includes a redundant fail-safe system including a pair of accelerator opening sensors to sense an accelerator opening. When one of the accelerator opening sensors is damaged to output an incorrect signal because of its abnormality or failure, the failure is detected by comparison between the signals output by the two accelerator opening sensors.

Similarly, some of the control systems include a redundant fail-safe system including a pair of throttle position sensors (throttle angle sensors) to sense a valve opening (valve rotation angle) of a throttle valve for regulating the quantity of intake air flowing into cylinders. When one of the throttle position sensors is damaged to output an incorrect signal because of its abnormality or failure, the failure is detected by comparison between the signals output by the two throttle position sensors.

SUMMARY OF THE INVENTION

Figure 4:
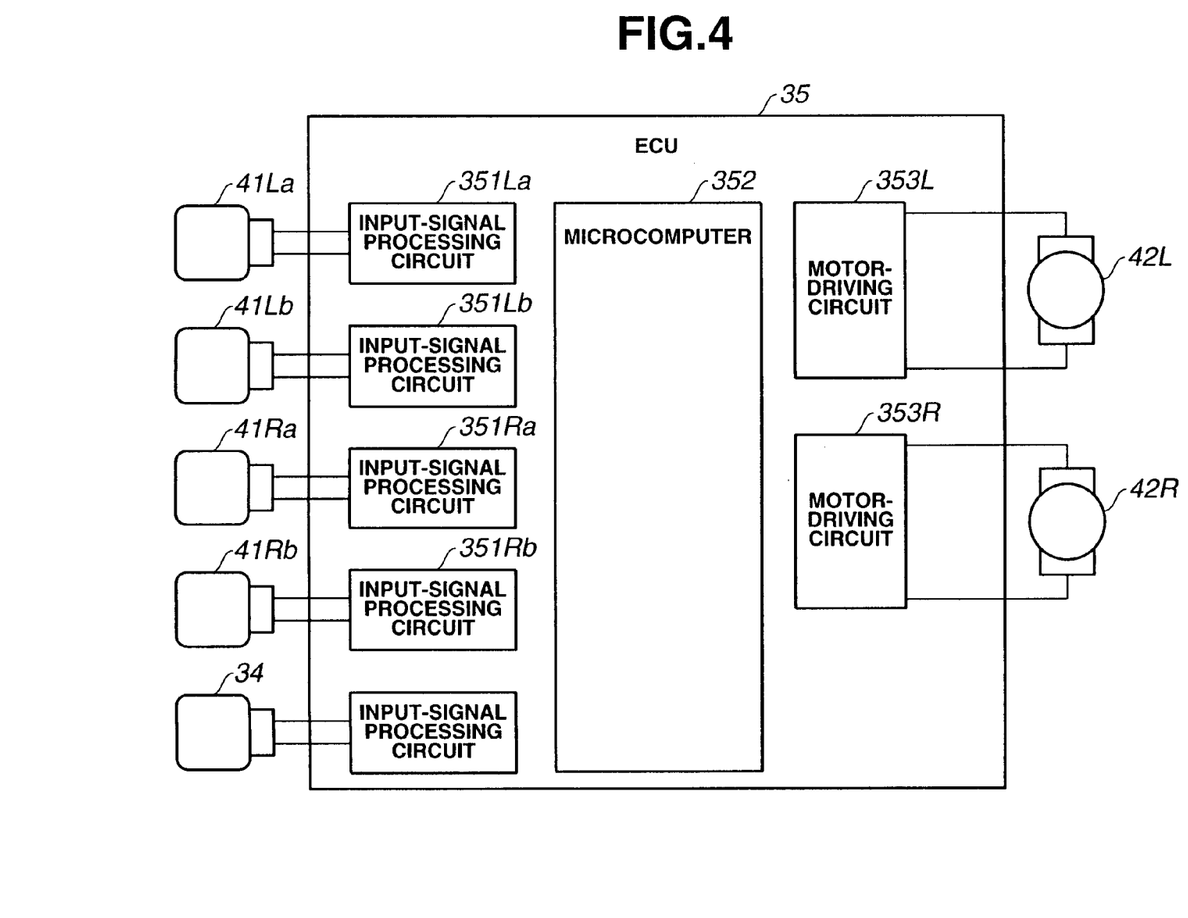
FIG. 4 is a schematic diagram depicting a basic diagnostic system for an internal combustion engine, which is configured to be mounted on the engine of FIG. 6.
Figure 6:
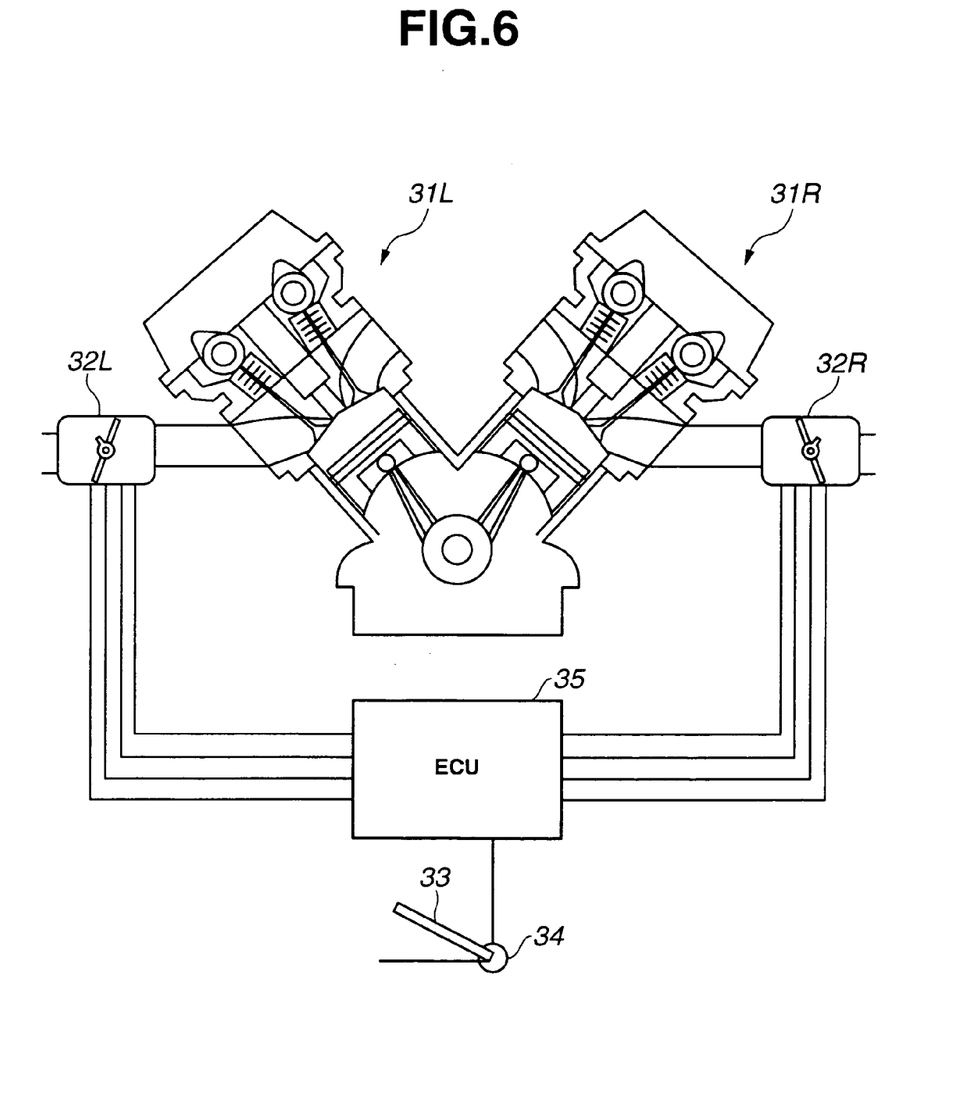
FIG. 6 is a schematic diagram depicting a V-type engine including a pair of cylinder banks, and a basic control system for controlling throttle valves.

The following describes a basic diagnostic system for an internal combustion engine, which employs such a redundant system for a throttle valve as discussed above. FIG. 6 is a schematic diagram depicting a V-type engine including a plurality of cylinder banks, and a control system for controlling throttle valves. FIG. 4 is a schematic diagram depicting a basic diagnostic system for an internal combustion engine, which is configured to be mounted on the engine of FIG. 6. As shown in FIG. 6, the V-type engine includes on both sides of a crankshaft a left cylinder bank 31L (on the left side of FIG. 6) including a plurality of cylinders, and a right cylinder bank 31R (on the right side of FIG. 6) including a plurality of cylinders. A left throttle valve 32L is mounted in left cylinder bank 31L, to control the quantity of intake air flowing into the plurality of cylinders of left cylinder bank 31L. A right throttle valve 32R is mounted in right cylinder bank 31R, to control the quantity of intake air flowing into the plurality of cylinders of right cylinder bank 31R. The openings of throttle valves 32L, 32R are each controlled by an electrical control unit (ECU) 35 in accordance with an accelerator opening of accelerator pedal 33 detected by an accelerator opening sensor 34.

As shown in FIG. 4, a first left throttle position sensor 41La and a second left throttle position sensor 41Lb are mounted in left cylinder bank 31L, to detect the opening of left throttle valve 32L. A first right throttle position sensor 41Ra and a second right throttle position sensor 41Rb are mounted in right cylinder bank 31R, to detect the opening of right throttle valve 32R. ECU 35 includes a first left input-signal processing circuit 351La, a second left input-signal processing circuit 351Lb, a first right input-signal processing circuit 351Ra, and a second right input-signal processing circuit 351Rb to process signals input from first left throttle position sensor 41La, second left throttle position sensor 41Lb, first right throttle position sensor 41Ra, and second right throttle position sensor 41Rb. Processed data is output to a microcomputer 352 of ECU 35, which controls the operation of the engine in accordance with the processed data.

Left throttle valve 32L is actuated by a left throttle motor 42L driven by a left motor-driving circuit 353L of ECU 35. Right throttle valve 32R is actuated by a right throttle motor 42R driven by a right motor-driving circuit 353R of ECU 35.

Figure 5:
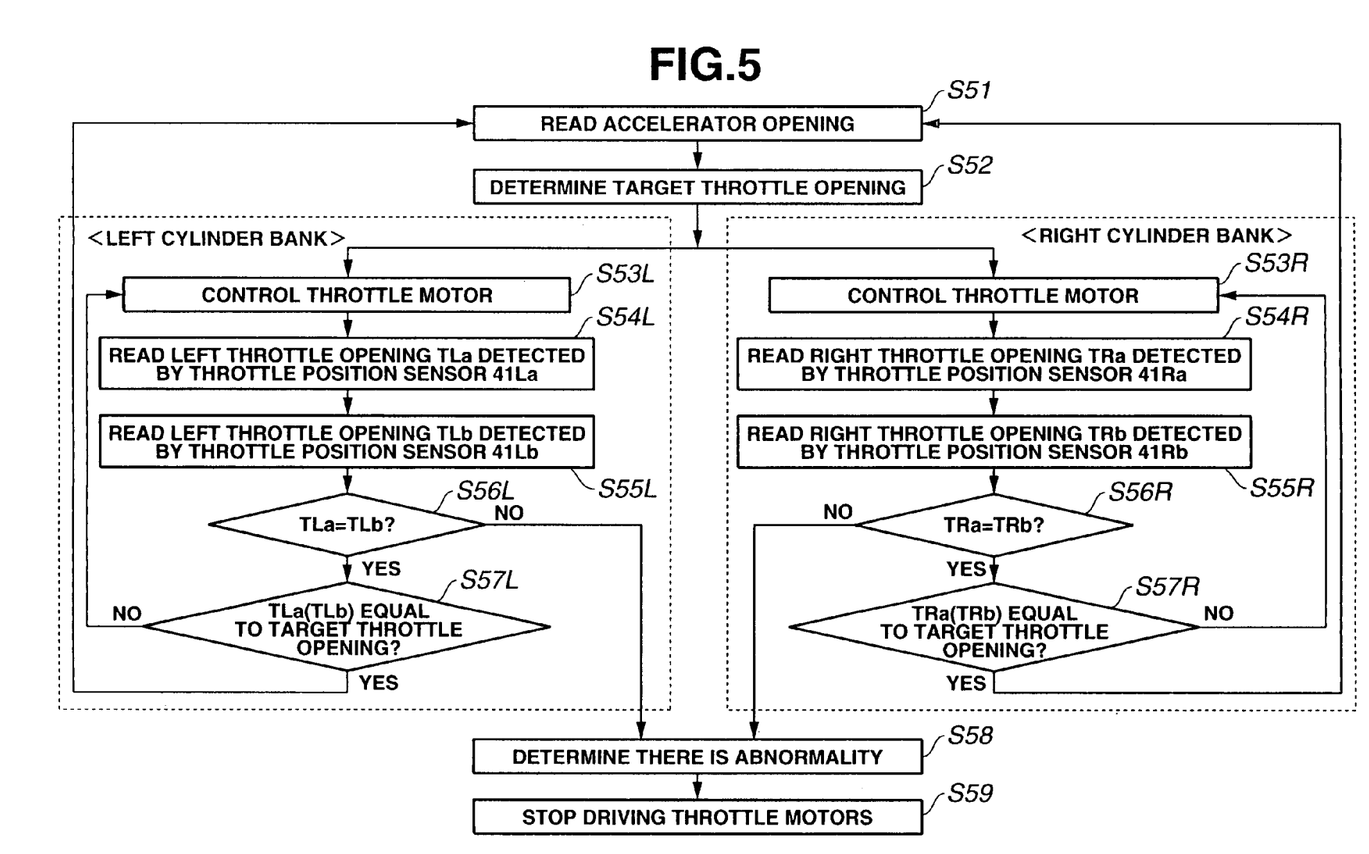
FIG. 5 is a flow chart depicting a process of the diagnosis executed by the diagnostic system of FIG. 4.

FIG. 5 is a flow chart depicting a process of the diagnosis executed by the diagnostic system of FIG. 4. This process determines whether there is abnormality or a failure in throttle position sensors 41La, 41Lb, 41Ra, and 41Rb. As shown in FIG. 5, first, at step S51, ECU 35 reads an accelerator opening detected by accelerator opening sensor 34. Next, at step S52, ECU 35 calculates a target throttle opening in accordance with the detected accelerator opening. Next, the routine branches to two parallel processes for left cylinder bank 31L and right cylinder bank 31R.

In the left branch in FIG. 5, first, at step S53L, ECU 35 controls left throttle motor 42L in accordance with the determined target throttle opening, to adjust the opening of left throttle valve 32L. Next, at step S54L, ECU 35 reads a throttle opening TLa of left throttle valve 32L which is detected by first left throttle position sensor 41La. Next, at step S55L, ECU 35 reads a throttle opening TLb of left throttle valve 32L which is detected by second left throttle position sensor 41Lb.

Next, at step S56L, ECU 35 makes a check to determine whether or not estimated throttle openings TLa and TLb are same. When the answer to step S56L is YES, the routine proceeds to step S57L. At step S57L, ECU 35 makes a check to determine whether or not the electric current throttle position and the target throttle opening are same. When the answer to step S57L is YES, the routine returns to step S51L. On the other hand, when the answer to step S57L is NO, the routine returns to step S53L.

When the answer to step S56L is NO, the routine proceeds to step S58. At step S58, ECU 35 determines that one of the signals input from left throttle position sensors 41La, 41Lb is incorrect, or that there is a failure in one or both of left throttle position sensors 41La, 41Lb. Next, at step S59, ECU 35 controls left motor-driving circuit 353L, to stop driving left throttle motor 42L in a safe mode.

The branched process for right cylinder bank 31R is similar to the left one previously discussed. In this process, ECU 35 controls first right throttle position sensor 41Ra, second right throttle position sensor 41Rb, and right throttle motor 42R (at steps S53R through S57R), determines that there is abnormality in accordance with disagreement of detected values (at step S58), and stops driving right throttle motor 42R (at step S59).

As discussed above, this technique uses four throttle position sensors for two throttle valves 32L, 32R mounted in cylinder banks 31L, 31R of a V-type engine. This configuration enlarges the whole system, to increase the cost. In addition, as shown in FIG. 5, the process of the diagnosis executed by the control system, in which the system reads four throttle openings detected by throttle position sensors 41La, 41Lb, 41Ra, 41Rb, and compares twice two of the detected throttle openings, is compound or redundant, resulting in complicating the control software program implementing the control process.

It is an object of the present invention to provide a compact diagnostic system for an internal combustion engine, including a small number of parts, and configured to operate in a simple control process.

According to one aspect of the present invention, a diagnostic system for an internal combustion engine including a plurality of cylinder banks each mounting thereon an actuator for adjusting a common control variable in relation to an associated one of the cylinder banks, the diagnostic system comprises a sensor mounted in each of the cylinder banks, to collect information needed to determine an estimate of the control variable in relation to an associated one of the cylinder banks, and a control unit configured to be connected electrically to the sensors, and to the actuators, for performing the following, controlling the actuators in accordance with a common target for the control variables of the cylinder banks, determining the estimates of the control variables, comparing the estimates of the control variables with each other, and determining whether or not there is abnormality in at least one of the sensors and the actuators, in accordance with the comparison of the estimates of the control variables.

According to another aspect of the invention, a diagnostic system for an internal combustion engine including a plurality of cylinder banks each mounting thereon actuating means for adjusting a common control variable in relation to an associated one of the cylinder banks, the diagnostic system comprises sensing means for being mounted in each of the cylinder banks, to collect information needed to determine an estimate of the control variable in relation to an associated one of the cylinder banks, and control means for being connected electrically to the sensing means, and to the actuating means, for performing the following, controlling the actuating means in accordance with a common target for the control variables of the cylinder banks, determining the estimates of the control variables, comparing the estimates of the control variables with each other, and determining whether or not there is abnormality in at least one of the sensing means and the actuating means, in accordance with the comparison of the estimates of the control variables.

According to a further aspect of the invention, a method of controlling a diagnostic system for an internal combustion engine including a plurality of cylinder banks each mounting thereon an actuator for adjusting a common control variable in relation to an associated one of the cylinder banks, the diagnostic system including a sensor mounted in each of the cylinder banks, to collect information needed to determine an estimate of the control variable in relation to an associated one of the cylinder banks, the method comprises controlling the actuators in accordance with a common target for the control variables of the cylinder banks, determining the estimates of the control variables, comparing the estimates of the control variables with each other, and determining whether or not there is abnormality in at least one of the sensors and the actuators, in accordance with the comparison of the estimates of the control variables.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
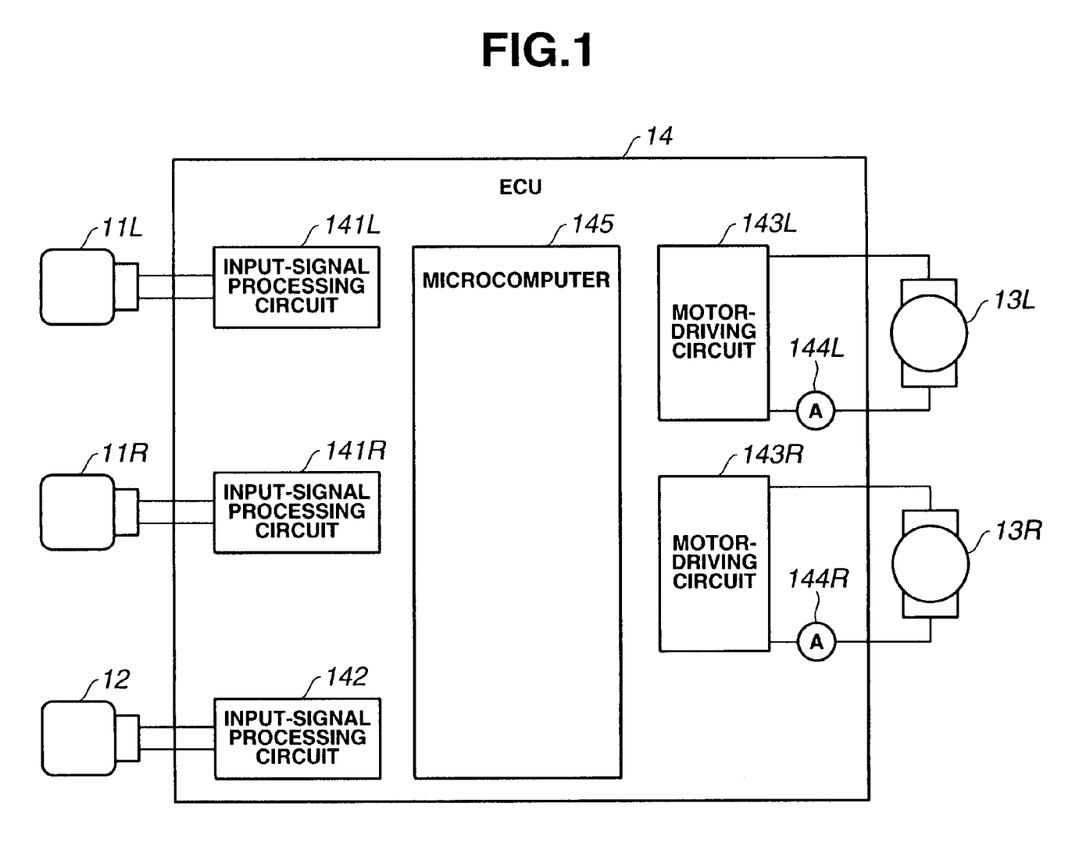
FIG. 1 is a schematic diagram depicting a diagnostic system for an internal combustion engine in accordance with an embodiment of the present invention, which is configured to be mounted on the engine of FIG. 3.
Figure 2:
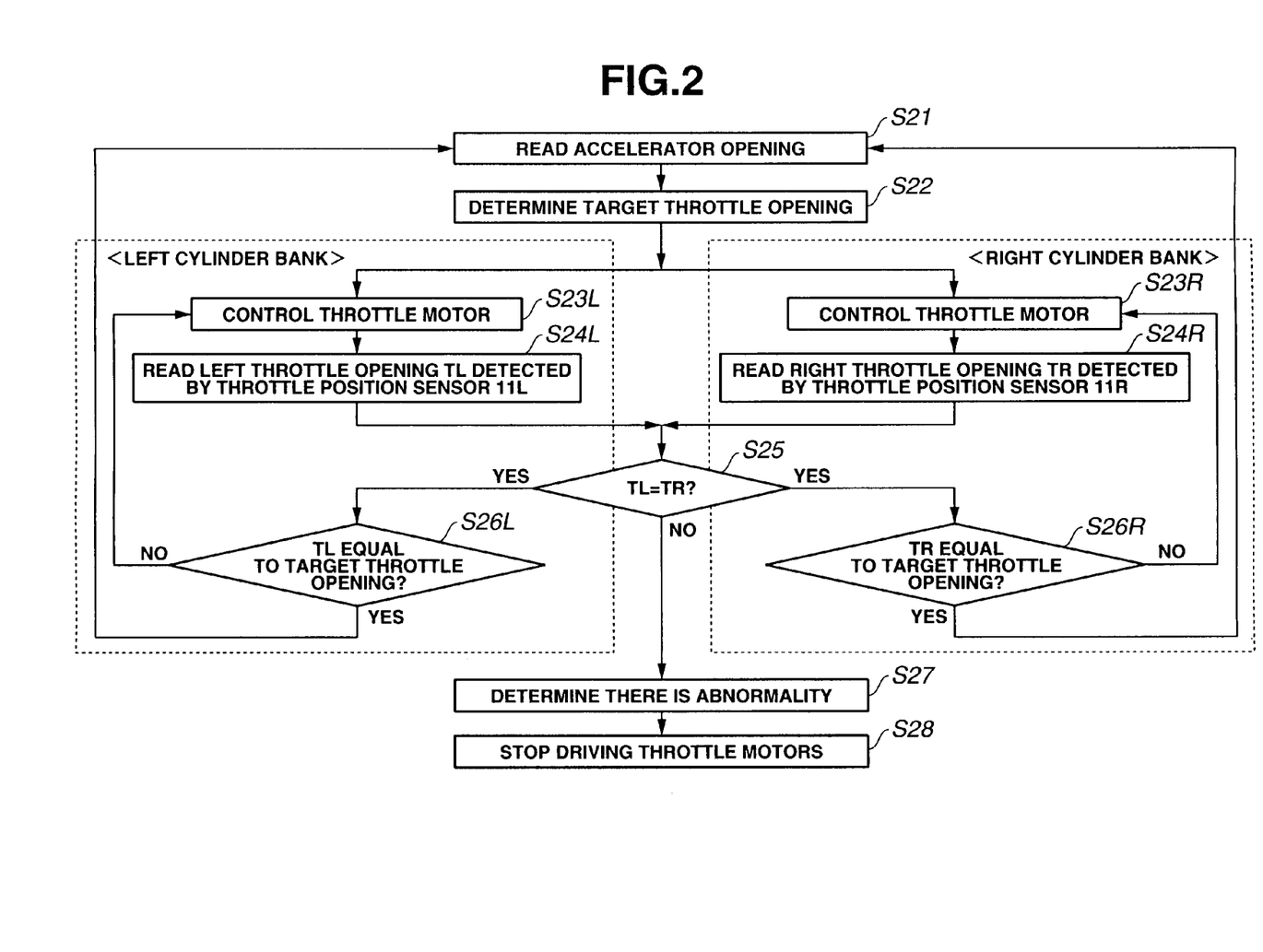
FIG. 2 is a flow chart depicting a process of the diagnosis executed by the diagnostic system of FIG. 1.

Referring now to FIGS. 1 and 2, there is shown a diagnostic system for an internal combustion engine in accordance with an embodiment of the present invention. FIG. 1 is a schematic diagram depicting a diagnostic system for an internal combustion engine in accordance with an embodiment of the present invention, which is configured to be mounted on the V-type engine of FIG. 3. The diagnostic system includes a pair of throttle position sensors 11L, 11R, an accelerator opening sensor 12, a pair of throttle motors 13L, 13R, and an ECU 14.

Figure 3:
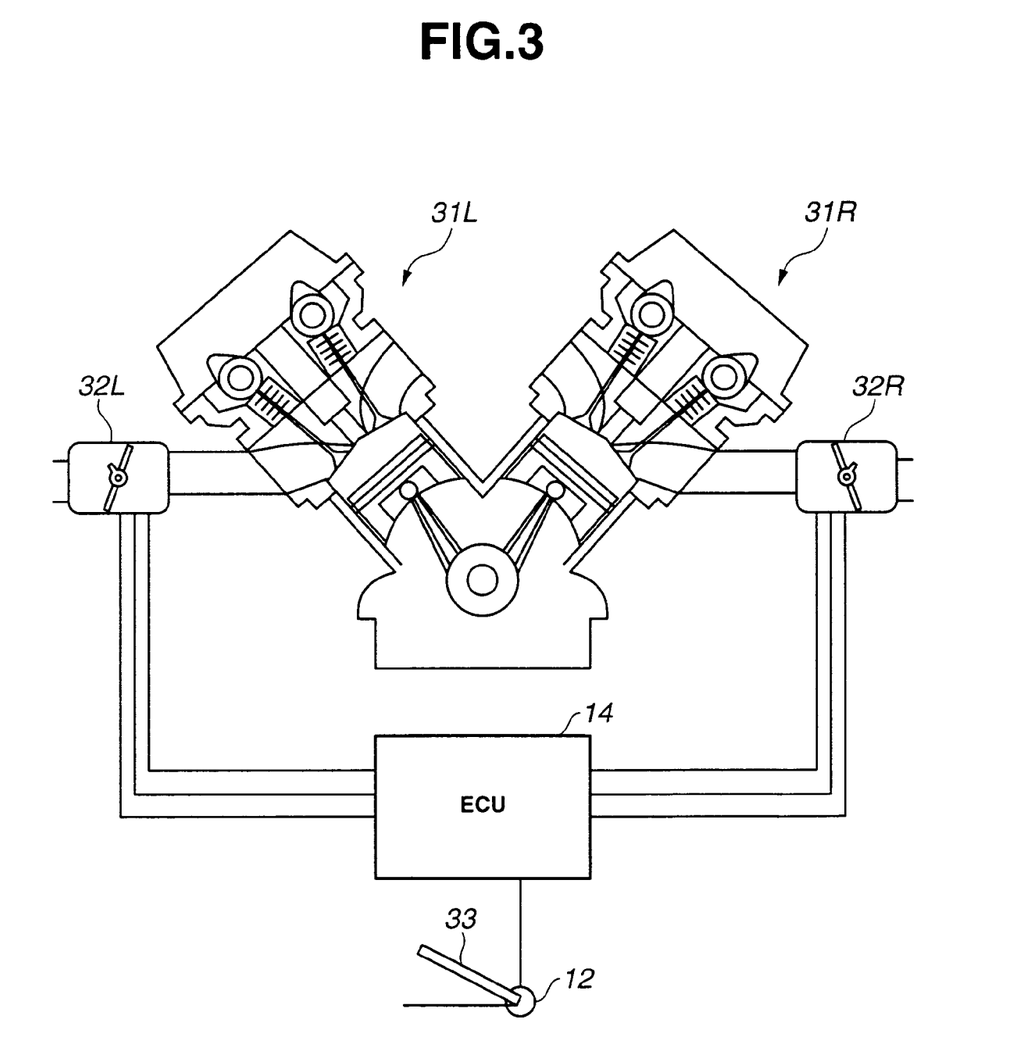
FIG. 3 is a schematic diagram depicting a V-type engine including a pair of cylinder banks, and a control system for controlling throttle valves, in accordance with the embodiment of the present invention.

As shown in FIG. 3, the V-type engine includes on both sides of a crankshaft a left cylinder bank 31L (on the left side of FIG. 3) including a plurality of cylinders, and a right cylinder bank 31R (on the right side of FIG. 3) including a plurality of cylinders. A left throttle valve 32L is mounted in left cylinder bank 31L, to control or adjust the quantity of intake air flowing into the plurality of cylinders of left cylinder bank 31L. A right throttle valve 32R is mounted in right cylinder bank 31R, to control or adjust the quantity of intake air flowing into the plurality of cylinders of right cylinder bank 31R. Left throttle position sensor 11L is mounted in left cylinder bank 31L, to detect the opening of left throttle valve 32L, or to collect information needed to determine an estimate of the opening of left throttle valve 32L as a control variable. Right throttle position sensor 11R is mounted in right cylinder bank 31R, to detect the opening of right throttle valve 32R as a control variable.

Accelerator opening sensor 12 is mounted at accelerator pedal 33, to detect the accelerator opening of accelerator pedal 33.

Left throttle motor 13L is mounted at left throttle valve 32L, to drive an actuating section for actuating left throttle valve 32L. Right throttle motor 13R is mounted at right throttle valve 32R, to drive an actuating section for actuating right throttle valve 32R. Thus, the combination of a throttle motor and an actuating section serves as an actuator for adjusting a quantity of intake air flowing into a cylinder bank.

ECU 14 functions as a control unit for controlling the normal operation of the V-type engine of FIG. 3, and for executing a diagnostic process including abnormality detection in accordance with a prepared control program. The V-type engine includes a pair of individual throttle valves, that is, left throttle valve 32L for left cylinder bank 31L, and right throttle valve 32R for right cylinder bank 31R. Left throttle valve 32L and right throttle valve 32R are controlled in accordance with a common target for the openings of the throttle valves as control variables, while left cylinder bank 31L and right cylinder bank 31R are controlled in accordance with a common target or a common control objective. ECU 14 includes input-signal processing circuits 141L, 141R, and 142, a pair of motor-driving circuits 143L, 143R, a pair of current sensors 144L, 144R, and a microcomputer 145.

Left input-signal processing circuit 141L receives a sensor signal of the opening of left throttle valve 32L from left throttle position sensor 11L. Left input-signal processing circuit 141L processes the input signal so that the processed signal is suitable as an input to microcomputer 145, and outputs the processed signal to microcomputer 145. Right input-signal processing circuit 141R receives a sensor signal of the opening of right throttle valve 32R from right throttle position sensor 11R. Right input-signal processing circuit 141R processes the input signal so that the processed signal is suitable as an input to microcomputer 145, and outputs the processed signal to microcomputer 145. Input-signal processing circuit 142 receives a sensor signal of the accelerator opening from accelerator opening sensor 12. Right input-signal processing circuit 141R processes the input signal so that the processed signal is suitable as an input to microcomputer 145, and outputs the processed signal to microcomputer 145.

Microcomputer 145 issues commands to motor-driving circuits 143L, 143R. Left motor-driving circuit 143L supplies an electric current driving left throttle motor 13L, in accordance with the command from microcomputer 145. Right motor-driving circuit 143R supplies an electric current driving right throttle motor 13R, in accordance with the command from microcomputer 145.

Between left motor-driving circuit 143L and left throttle motor 13L is disposed a left current sensor 144L to sense as a control variable the amount of an electric current passing therebetween or through left throttle motor 13L. Between right current sensor 144R and right throttle motor 13R is disposed a right current sensor 144R to sense as a control variable the amount of an electric current passing therebetween or through right throttle motor 13R.

Serving as the nerve center of ECU 14, microcomputer 145 is a microprocessor including components, such as a CPU, a memory, an input unit, and an output unit, to diagnose the engine in accordance with a control program. Microcomputer 145 reads signals output from throttle position sensors 11L, 11R, accelerator opening sensor 12, and current sensors 144L, 144R, executes a control logic (a program) stored in the memory, and outputs signals to motor-driving circuits 143L, 143R. In addition, microcomputer 145 manages and controls all operations of the engine, which include a diagnostic process as follows.

FIG. 2 shows a flow chart depicting a diagnostic process of diagnosing throttle position sensors 11L, 11R, and throttle valves 32L, 32R. As shown in FIG. 2, first, at step S21, ECU 14 reads an accelerator opening detected by accelerator opening sensor 12. Next, at step S22, ECU 14 determines a target throttle opening in accordance with the accelerator opening. Next, the routine proceeds to step S23L and step S23R, which are executed in parallel. Left cylinder bank 31L and right cylinder bank 31R are controlled in accordance with a common target.

The following describes a branched process for left cylinder bank 31L. At step S23L, microcomputer 145 outputs a driving signal to left motor-driving circuit 143L. Left motor-driving circuit 143L drives left throttle motor 13L in accordance with the driving signal. Next, at step S24L, ECU 14 reads a throttle opening TL of left throttle valve 32L, which is detected by left throttle position sensor 11L. Next, the routine proceeds to step S25.

The following describes a branched process for right cylinder bank 31R. At step S23R, microcomputer 145 outputs a driving signal to right motor-driving circuit 143R. Right motor-driving circuit 143R drives right throttle motor 13R in accordance with the driving signal. Next, at step S24R, ECU 14 reads a throttle opening TR of right throttle valve 32R, which is detected by right throttle position sensor 11R. Next, the routine proceeds to step S25.

At step S25, ECU 14 compares estimated throttle opening TL with estimated throttle opening TR. When the answer to step S25 is YES, the routine proceeds to steps S26L and S26R. When the answer to step S25 is NO, the routine proceeds to step S27.

At step S26L, ECU 14 makes a check to determine whether or not throttle opening TL is equal to the target throttle opening determined at step S22. When the answer to step S26L is YES, the routine returns to step S21. When the answer to step S26L is NO, the routine returns to step S23L.

At step S26R, ECU 14 makes a check to determine whether or not throttle opening TR is equal to the target throttle opening determined at step S22. When the answer to step S26R is YES, the routine returns to step S21. When the answer to step S26L is NO, the routine returns to step S23L.

At step S27, microcomputer 145 determines that there is a failure or abnormality in the engine. More specifically, microcomputer 145 determines that there is a failure in left throttle position sensor 11L and/or right throttle position sensor 11R, or that there is a failure in left throttle valve 32L and/or right throttle valve 32R. Next, at step S28, microcomputer 145 changes the driving mode to a safe mode, to stop driving throttle motors 13L, 13R.

Accordingly, providing only one throttle position sensor at each of cylinder banks 31L, 31R is enough to determined where there is a failure in throttle position sensors 11L, 11R, or in throttle valves 32L, 32R. This is based on a fact that left cylinder bank 31L and right cylinder bank 31R in the V-type engine are operated in a same manner, that is, are controlled in accordance with a common target. This configuration allows downsizing and simplifying the structure of the system, and thereby to decrease the production cost. The number of throttle position sensors are small, so as to decrease the number of steps in the control process, and thereby to simplify the control algorithm so that the control software program for the process is easy to develop.

When a failure is detected, ECU 14 stops or inhibits driving the throttle motor. Accordingly, it is prevented that the engine is controlled under abnormal driving conditions.

Alternatively, driving electric currents detected by current sensors 144L, 144R may be used for diagnosing instead of throttle openings TL, TR detected by throttle position sensors 11L, 11R. More specifically, when it is determined that the driving electric currents are different, ECU 14 determines that there is a failure in one or both of current sensors 144L, 144R, in one or both of throttle motors 13L, 13R, or in one or both of throttle valves 32L, 32R.

In the shown embodiment, the diagnostic system is configured to be mounted on a V-type engine. Alternatively, this technique may be configured to be mounted on in-line engines that include a plurality of cylinder banks arranged in line and a control unit to control the cylinder banks in accordance with a common target.

This diagnostic system is also applied to an engine that includes intake and exhaust valves whose operating timing and lift (up-and-down movement distance) be controlled in a same manner, in accordance with a common target. Detected lifts of the intake and exhaust valves may be used to determine whether or not there is a failure in the engine.

This application is based on a prior Japanese Patent Application No. 2004-131093 filed on Apr. 27, 2004. The entire contents of this Japanese Patent Application No. 2004-131093 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A diagnostic system for an internal combustion engine including a plurality of cylinder banks each mounting thereon actuating means for adjusting a common control variable in relation to an associated one of the cylinder banks, the diagnostic system comprising:
   sensing means for being mounted in each of the cylinder banks, to collect information needed to determine an estimate of the control variable in relation to an associated one of the cylinder banks; and
   control means for being connected electrically to the sensing means, and to the actuating means, for performing the following:
      controlling the actuating means in accordance with a common target for the control variables of the cylinder banks;
      determining the estimates of the control variables;
      comparing the estimates of the control variables with each other; and
      determining whether or not there is abnormality in at least one of the sensing means and the actuating means, in accordance with the comparison of the estimates of the control variables.

2. A diagnostic system for an internal combustion engine including a plurality of cylinder banks each mounting thereon an actuator for adjusting a common control variable in relation to an associated one of the cylinder banks, the diagnostic system comprising:
   a sensor mounted in each of the cylinder banks, to collect information needed to determine an estimate of the control variable in relation to an associated one of the cylinder banks; and
   a control unit configured to be connected electrically to the sensors, and to the actuators, for performing the following:
      controlling the actuators in accordance with a common target for the control variables of the cylinder banks;
      determining the estimates of the control variables;
      comparing the estimates of the control variables with each other; and
      determining whether or not there is abnormality in at least one of the sensors and the actuators, in accordance with the comparison of the estimates of the control variables.

3. The diagnostic system as claimed in claim 1, wherein the control unit is configured to determine whether or not all the estimates of the control variables are same, and to determine that there is abnormality in at least one of the sensors and the actuators, in case it is unsatisfied that all the estimates of the control variables are same.

4. The diagnostic system as claimed in claim 1, wherein each of the actuators comprising a valve for adjusting a quantity of intake air flowing into the associated cylinder bank; and the common control variable is a valve opening of an associated one of the valves.

5. The diagnostic system as claimed in claim 4, wherein the valve is a throttle valve.

6. The diagnostic system as claimed in claim 4, wherein the valve is an intake valve.

7. The diagnostic system as claimed in claim 4, wherein the valve is an exhaust valve.

8. The diagnostic system as claimed in claim 1, wherein each of the actuators is configured to adjust a quantity of intake air flowing into the associated cylinder bank; and the common control variable is a driving current passing through an associated one of the actuators.

9. The diagnostic system as claimed in claim 1, wherein the control unit is configured to inhibit driving the actuators in case it is determined that there is abnormality in at least one of the sensors and the actuators.

10. The diagnostic system as claimed in claim 1, wherein the engine is a V-type engine including two cylinder banks on both sides of a crankshaft of the engine.

11. The diagnostic system as claimed in claim 1, wherein the engine is an in-line engine including the plurality of cylinder banks arranged in line.

12. A method of controlling a diagnostic system for an internal combustion engine including a plurality of cylinder banks each mounting thereon an actuator for adjusting a common control variable in relation to an associated one of the cylinder banks, the diagnostic system including a sensor mounted in each of the cylinder banks, to collect information needed to determine an estimate of the control variable in relation to an associated one of the cylinder banks, the method comprising:
   controlling the actuators in accordance with a common target for the control variables of the cylinder banks;
   determining the estimates of the control variables;
   comparing the estimates of the control variables with each other; and
   determining whether or not there is abnormality in at least one of the sensors and the actuators, in accordance with the comparison of the estimates of the control variables.

* * * * *